United States Patent Office 2,776,241
Patented Jan. 1, 1957

2,776,241

INJECTABLE X-RAY CONTRAST AGENTS COMPRISING SALTS OF N-ACYL DERIVATIVES OF 2,4,6-TRIIODO-3-AMINOBENZOIC ACID

Hans Priewe, Berlin-Steglitz, and Rudi Rutkowski, Berlin-Schoneberg, Germany, assignors to Schering A. G., Berlin, Germany, a corporation of Germany No Drawing. Application July 20, 1953, Serial No. 369,192

Claims priority, application Germany August 6, 1952

6 Claims. (Cl. 167—95)

This invention relates to X-ray contrast agents and their manufacture and in particular to new N-acyl-3-amino-2,4,6-triiodobenzoic acids of which the N-acyl residue is derived from a polybasic carboxylic acid, and salts, and functional carboxyl derivatives, such as esters and amides, of such compounds.

The present invention has for its object to provide new products of the following Formula I

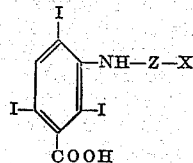

wherein Z is the acyl group of a polybasic carboxylic acid with 1 to 16 carbon atoms and X is a member selected from the group consisting of the hydroxyl group, a lower alkoxy group, the amino group, a lower alkyl amino group, a monophenyl amino group, and the 3-carboxy-2,4,6-triiodo phenyl amino group, and the substantially non-toxic functional carboxyl derivatives of said acids, said derivatives being selected from the group consisting of their salts with alkali and alkaline earth metals, ammonia, and substantially non-toxic organic bases, their esters with lower alkanols and amino lower alkanols, their acid amides wherein the amido group may be substituted by a lower alkyl radical, a hydroxy lower alkyl group, or a carboxy lower alkyl group, or wherein the nitrogen atom of the amido group may be part of a mononuclear heterocyclic radical.

Another object of this invention is to provide simple and effective processes of preparing such new compounds by using 2,4,6-tri-iodo-3-amino benzoic acid or its functional carboxyl derivatives as the one reaction component and reactive polycarboxylic acid derivatives including reactive carbonic acid derivatives as the other reaction component.

A further object of this invention is to provide new preparations which are excellent, non-irritating, heat sterilizable, X-ray contrast agents that permit X-ray visualization of various parts of the human body, especially of kidney, bladder and urethra, gall bladder, heart, blood vessels and others.

Other objects and advantageous features of this invention will become apparent as the description proceeds.

By reaction of 2,4,6-triiodo-3-aminobenzoic acid with acid halides or with ester acid halides or with N-substituted or unsubstituted amide acid halides of polybasic carboxylic acids, especially of dibasic acids such as carbonic acid or dicarboxylic acids, compounds are obtained which correspond to the following Formula II

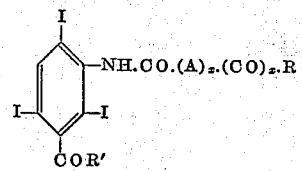

wherein A represents a saturated or unsaturated open chain, cyclic or mixed open chain-cyclic divalent hydrocarbon residue with not more than 16 carbon atoms, said residue being a carbon chain consisting of carbon atoms or a carbon chain interrupted by polyvalent hetero atoms or hetero atom groups and being unsubstituted or substituted by one or several free carboxyl groups which may be converted into their functional derivatives or by mono- or polyvalent hetero atoms of functional groups containing hetero atoms or functional derivatives of such groups, R and R' indicate hydroxyl, alkoxy, or unsubstituted or mono- or disubstituted amino groups, while $x$ indicates the number 0 or 1.

When reacting said 2,4,6-triiodo-3-amino benzoic acid with dibasic acids, compounds of the general Formula III are obtained

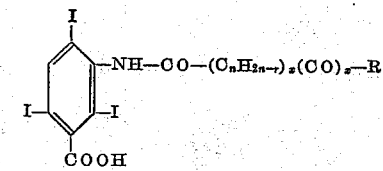

in which $n$ indicates the numbers 0, 1, 2, 3 . . . to 14.
$r$ indicates the numbers 0, 2, 4, 6 . . . to 14 ($2n-r$ being $\geqq 0$, if $n$ is an even figure, and $2n-r$ being $\geqq 2$, if $n$ is an odd figure).
$x$ indicates the number 0 or 1.
R indicates the group

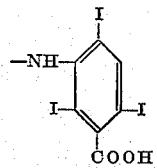

a hydroxyl group, a hydroxyalkyl group or an unsubstituted or mono- or disubstituted amido group.

When using carboxylic acids containing more than two carboxyl groups, it is, of course, understood that in the above mentioned formulas, for each additional carboxyl group, one hydrogen atom of the groups A or ($C_nH_{2n-r}$), respectively, is replaced by the (CO).R group.

It has been found that these substances are good X-ray contrast agents and it is of especial interest that within the classes of compounds contemplated by this invention there are contained representatives of all three of the most important types of X-ray contrast agents. Some derivatives, especially those which contain only one triiodo amino benzoic acid residue, are readily excreted and, therefore, are suitable for X-ray visualization of the kidneys. Other compounds, especially those which contain two triiodo amino benzoic acid residues, on account of their different excretability, represent excellent and remarkably non-toxic cholecystographic agents. Furthermore it was found that some of the compounds according to the present invention are capable of forming stable emulsions and suspensions. They are, therefore, especially useful as agents for vasography.

Moreover the ester acid anilide derivatives of the lower and intermediate representatives provide important intermediate products for the free anilido carboxylic acids, which are easily obtained therefrom by hydrolysis and are themselves good X-ray contrast agents for examination of the kidneys.

The compounds can be used in the form of their salts, especially the alkali salts or the salts with non-toxic organic bases.

It has further been found that the usefulness of N-derivatives of 2,4,6-triiodo-3-aminobenzoic acid and X-ray contrast agents is not limited to the free acids of the above given formulas, since it has been found that the nuclear carboxyl groups in said formulas and/or any free carboxyl group present in the amide side chain may be converted into functional groups. Thus, for instance, the carboxyl group —COOH may be replaced by the —COR' group. In said —COR' group, R' indicates an alkoxy group or an amino group which may be substituted. These functional groups may contain other substituents. Thus, for instance, R' may be an amino alkoxy group, such as —O.CH$_2$CH$_2$.NH$_2$ or

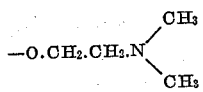

an alkanol amido group, such as —NH.CH$_2$.CH$_2$.OH, or —NH.CH$_2$.CH$_2$.O acyl, or a carboxy alkyl amino group, such as —NH.CH$_2$.COOH or —NH.CH$_2$.COOCH$_3$, and others.

Such functional derivatives are also prepared from 2,4,6-triiodo-3-amino benzoic acid by first converting, for instance, the carboxyl group of said starting material into a carboxy alkyl group and reacting the free amino group in said ester with an acid halide, an ester acid halide or an N-substituted or unsubstituted amide acid halide of a polybasic carboxylic acid. It is, however, in most cases of advantage to convert the carboxyl group by means of suitable agents into the ester, amide, or the like functional group after the 2,4,6-triiodo-3-amino benzoic acid has been condensed with said halogen derivatives of polycarboxylic acids. To produce, for instance, the esters or amides of the condensation product, it is of advantage to first convert the free carboxyl group of the anilide into the corresponding acid halide group, for instance, by reacting said anilide with agents capable of converting a carboxyl group into an acid halide group, such as thionyl chloride, phosphorus halides and the like, and then to react the resulting acid halide with suitable alcohols or amines to form the desired esters or amides. For, on account of steric hindrance, the carboxyl group in such anilides is only difficultly susceptible to direct esterification or conversion into the amides. Thereafter, if desired, carboxyl groups of the amide side chain which are still present in the form of their functional groups, such as in ester form, may be converted by hydrolysis into the free carboxyl groups.

Compounds which contain a free carboxyl group in the benzene nucleus and/or in the amide side chain may readily be converted into their non-toxic salts and used as contrast agents in such salt form, even if the carboxyl group present in the amide side chain or the benzene nucleus, respectively, is present in the form of a functional group, such as the ester or amide form.

Furthermore it has been found that the hydrogen atoms of the groups A or (C$_n$H$_{2n-r}$), respectively, may not only be substituted by the (CO).R group but also by other atoms or groups.

Useful X-ray contrast agents are, for instance, obtained when such hydrogen atoms are not, or not only, substituted by the group (CO).R but also by other groups such as hetero atoms, for example halogen, especially iodine, or functional groups containing hetero atoms, such as the hydroxyl, oxo or amino group, including functional conversions of said groups. Polyvalent hetero atoms such as O or S, or hetero groups such as —NH— of such substituent groups may be members of a hetero ring due to their attachment to two different carbon atoms.

In principle, there exists no difference between the methods of manufacture of such compounds and of those described above. If functional conversion of the nuclear carboxyl group is not required, the process is conducted in such a manner that the amino group of the triiodo amino benzoic acid is reacted with the corresponding acid derivatives, for example with the acid halides or anhydrides or with the ester acid halides or with N-substituted or unsubstituted amide acid halides of a polybasic carboxylic acid which is substituted in the desired manner by halogen or by the above specified functional groups. If desired, originally present substituents of the polybasic carboxylic acid may be converted into substituents which are actually required, subsequent to the reaction with 2,4,6-triodo-3-amino-benzoic acid. For instance, a hydroxyl group present in the polybasic acid reaction component may first be protected by conversion into an acyloxy group and may, after reaction of said polybasic acid derivative, be subjected to mild hydrolysis to reform the originally present hydroxyl group. If the nuclear carboxyl group shall be converted into a functional group, this conversion is advantageously effected after condensing the polycarboxylic acid halide with triiodo amino benzoic acid. Preferably the carboxylic group is first converted into the acid halide group for the reasons set forth above. One may, however, also proceed in a different way, namely one may first convert the nuclear carboxylic group into a functional group and then condense the resulting triiodo amino carboxylic acid derivative with the polycarboxylic acid halide. In all these reactions it is advisable to temporarily protect any group sensitive to or reactive with the polycarboxylic acid halide or with agents used in facilitating and accelerating the reaction, against the action of such reaction components and/or agents. For instance, free hydroxyl groups are preferably temporarily esterified before preparing the acid halide.

Compounds of similar usefulness as X-ray contrast agents than those described above are characterized by the presence of one or several polyvalent hetero atoms, such as oxygen, sulfur, and/or groups of hetero atoms, such as the imino group —NH— or a substituted imino group —NR'— in which R' is an organic residue, in the carbon atom chain A or (C$_n$H$_{2n-r}$), respectively, of the above given formulas. Said hetero atoms or groups of hetero atoms interrupt said carbon atom chain. Compounds of this type may, of course, also be substituted by other substituents, such as halogen, especially iodine, hydroxyl, oxo, amino groups or functional derivatives of such groups, as stated above.

Compounds of said type having a carbon chain interrupted by a hetero atom or by a group of hetero atoms or derivatives thereof, in which the carboxyl group is converted into a functional derivative group, are, for instance, produced by condensing triiodo amino benzoic acid or functional derivatives of the carboxyl group thereof, with suitable polybasic carboxylic acids, such as acids of the type of diglycolic acid

HOOC—CH$_2$—CH$_2$—O—CH$_2$—CH$_2$—COOH thiodiglycolic acid HOOC—CH$_2$—S—CH$_2$—COOH, dithiodiglycolic acid HOOC—CH$_2$—S—S—CH$_2$—COOH, piperazyl-N,N'-diacetic acid

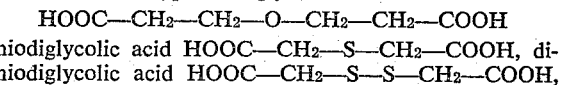

and similar polycarboxylic acids.

The following examples serve to illustrate the present invention, without, however, limiting the same thereto. The attached drawings illustrate the constitution of the various reaction products as they are obtained according to these examples.

Example 1

50 g. of 2,4,6-triiodo-3-amino benzoic acid are boiled under reflux with 10 g. of malonyl chloride in 500 cc. of benzene for 5 hours. After cooling, the residue obtained is filtered with suction, dissolved in caustic soda solution and precipitated with dilute hydrochloric acid. The crude malonic acid di-(3-carboxy-2,4,6-triiodo anilide) of the formula

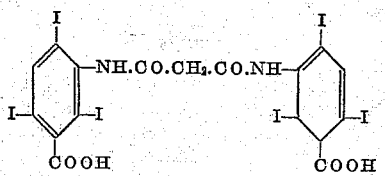

is recrystallized from methanol. Yield: 32.2 g., M. P. 255° C. (with decomposition).

Example 2

36 g. of succinyl chloride are heated for 12 hours on a steam bath in 400 cc. of toluene with 112.5 g. of triiodo amino benzoic acid. After cooling, the precipitate produced is filtered with suction, dissolved in caustic soda solution and precipitated with sulfurous acid. The crude succinic acid di-(3-carboxy-2,4,6-triiodo anilide) of the formula

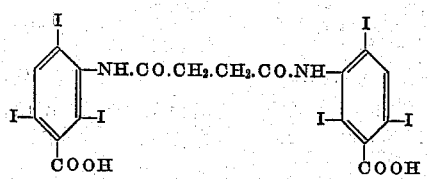

is, for purification, first extracted by boiling with methanol, then recrystallized from dry pyridine to yield the fairly difficultly soluble pyridine salt and said salt is split up with dilute hydrochloric acid. Yield of pure product: 46.2 g., M. P. 306–308° C. (with decomposition).

Example 3

50 g. of triiodo amino benzoic acid are heated for 8 hours on a steam bath with 50 cc. of ethyl oxalyl chloride. After cooling, the precipitate produced is filtered with suction and, on recrystallization from chloroform, pure 2,4,6-triiodo-3-carboxy phenyl amido oxalic acid ethyl ester of the formula

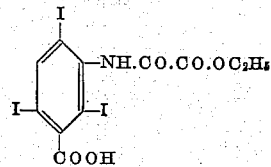

is obtained. Yield: 48.7 g., M. P. 235–236° C. (with decomposition).

For hydrolysis, 19 g. of the above ester are allowed to stand overnight in 200 cc. of 2N caustic soda solution and the acid is precipitated with dilute hydrochloric acid. The crude 2,4,6-triiodo-3-carboxy phenyl amido oxalic acid of the formula

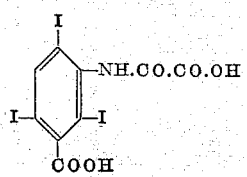

is recrystallized with alcohol. Yield: 12.5 g., M. P. 216–219° C. (with decomposition).

Example 4

50 g. of 2,4,6-triiodo-3-amino benzoic acid are boiled for 12 hours under reflux with 4.1 g. of oxalyl chloride in 200 cc. of benzene. After cooling, the resulting residue is extracted by boiling first with about 500 cc. of ether and then with about 500 cc. of methanol. The crude oxalic acid di-(3-carboxy-2,4,6-triiodo anilide) of the formula

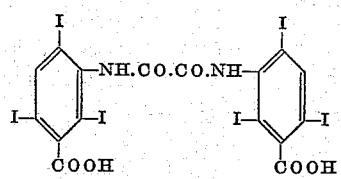

is, for purification, dissolved in caustic soda solution, filtered with charcoal, and precipitated with dilute hydrochloric acid. Yield: 42.6 g., M. P. 350–351° C. (with decomposition).

Example 5

125 g. of 2,4,6-triiodo-3-amino benzoic acid are dissolved in 250 cc. of chlorobenzene and 15 g. of adipic acid dichloride are added at a temperature between 110° C. and 130° C. drop by drop to said solution. After evolution of hydrochloric acid (about 2–3 hours) has ceased, the precipitated crude adipic acid di-(3-carboxy-2,4,6-triiodo anilide) of the formula

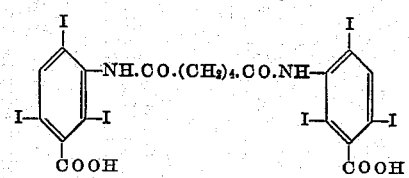

is filtered hot with suction, washed with chloro benzene, extracted by boiling with methanol and, for purification, dissolved in an amount of methanolic caustic soda solution required for neutralisation, filtered with charcoal, and precipitated with dilute hydrochloric acid. Yield: 82.3 g., M. P. 306–308° C. (with decomposition).

Example 6

88 g. of 2,4,6-triiodo-3-amino benzoic acid in 200 cc. of benzene are boiled under reflux for 20 hours with 12 g. of suberyl chloride. After cooling, the residue obtained is first extracted by boiling with ether and then dissolved in caustic soda solution, filtered with charcoal and precipitated with dilute hydrochloric acid. After recrystallization from methanol 55.4 g. of pure suberic acid di-(3-carboxy-2,4,6-triiodo anilide) of the formula

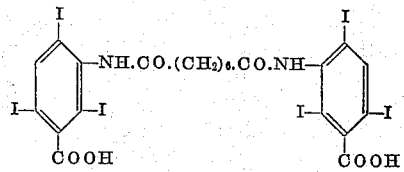

are obtained. M. P. 244–246° C. (with decomposition).

Example 7

80 g. of 2,4,6-triiodo-3-amino benzoic acid in 200 cc. of benzene are boiled under reflux for 15 hours with 11.7 g. of azelaic acid dichloride. After cooling, the residue obtained is extracted by boiling with ether, dissolved in caustic soda solution, filtered with decolorizing carbon, and precipitated with dilute hydrochloric acid. After recrystallization, pure azelaic acid di-(3-carboxy-2,4,6-triiodo anilide) of the formula

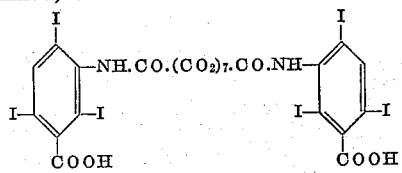

results. Yield: 62.4 g., M. P. 238–239° C. (with decomposition).

Example 8

52 g. of triiodo amino benzoic acid are dissolved, while heating, in 320 cc. of anhydrous chlorobenzene and about 60 cc. of the solvent are distilled off. Then, while boiling under reflux and stirring, 22 g. of adipic acid ethyl ester chloride are added dropwise and the mixture is further heated for 3 hours. The precipitate produced is filtered with suction while hot, washed with chlorobenzene, suspended is petrol ether, washed twice and dried with suction. Yield: 58 g. of adipic acid (3-carboxy-2,4,6-triiodo anilide)-ethyl ester of M. P. 175–177° C. of the formula

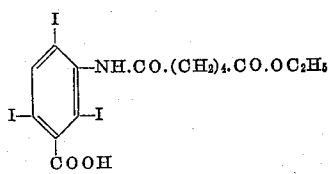

The compound can be purified by dissolving in sodium bicarbonate solution and reprecipitating with hydrochloric acid. 50 g. of the crude ester obtained as above are dissolved in 170 cc. of N sodium hydroxide solution and heated to 60° C. for 1½ hours. After cooling, the product is precipitated with dilute hydrochloric acid and the precipitate, after filtration with suction, is washed free from chlorine ions with as little water as possible. Yield: 46.2 g. of adipic acid mono-(3-carboxy-2,4,6-triiodo anilide) of M. P. 252–257° C. of the formula

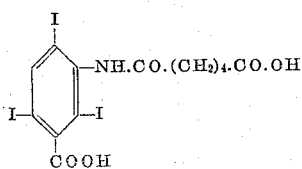

Example 9

150 g. of triiodo amino benzoic acid, dissovled in 750 cc. of dry chlorobenzene, are reacted with 50 cc. of a 20 percent, toluene solution of phosgene and the whole is boiled under reflux for 12 hours. The precipitate formed is filtered hot with suction, treated with ether, and subjected to reprecipitation from its methanolic caustic soda solution by means of hydrochloric acid. The pure N,N'-di-(3-carboxy-2,4,6-triiodo phenyl)-carbamide of the formula

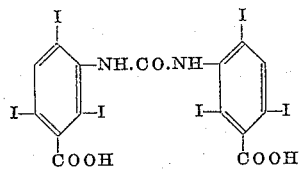

melts at 265–267° C.

Example 10

103 g. of triiodo amino benzoic acid, dissolved, while heating, in 600 cc. of dry chlorobenzene, are reacted dropwise within ½ hour with 11.7 g. of tricarballylic acid trichloride diluted with 30 cc. of dry chlorobenzene. After 50 minutes, the mixture is heated to boiling. After cooling, the precipitate produced is filtered with suction and dissolved in N sodium hydroxide solution. The solution is treated with animal charcoal, filtered, and acidified with hydrochloric acid to a pH of 1. The precipitate produced thereby is extracted twice with ether for removal of starting material. A pale yellowish powder remains having a melting point of 234–237° C. (with decomposition), which is tricarballylic acid tri-(3-carboxy-2,4,6-triiodo anilide) of the formula

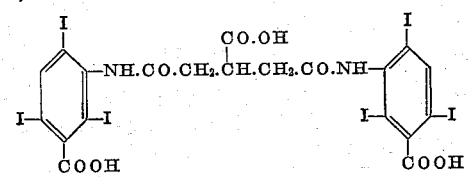

Example 11

5.7 g. of adipic acid di-(3-carboxy-2,4,6-triiodo anilide) obtained according to Example 5, are dissolved in 25 cc. of chlorobenzene and 50 cc. of thionyl chloride are introduced into the solution. The solution is heated on the steam bath until no further evolution of hydrochloric acid takes place. The excess of thionyl chloride is distilled off and 10 cc. of methanol are added to the resulting adipic acid di-(2,4,6-triiodo anilide-3-carboxylic acid chloride), which remains dissolved in the chlorobenzene. The mixture is heated under reflux. After distilling off the solvent in a vacuum, adipic acid di-(2,4,6-triiodo-3-carbomethoxy anilide) of the formula

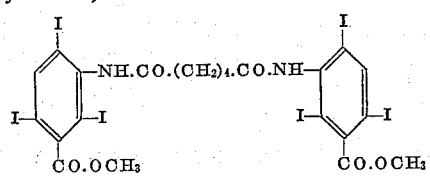

remains. It may be recrystallized from methanol. M. P. 98–103° C. (with decomposition), yield 3.6 g.

Example 12

103 g. of triiodo amino benzoic acid are dissolved at 80–100° C. in 250 cc. of chlorobenzene, while heating and stirring and under a slight vacuum. About 100 cc. of water-containing chlorobenzene are distilled off from the solution. The distillation residue is cooled to 25° C. and reacted with 170 cc. of oxalyl chloride. Reaction at first proceeds exothermically. Subsequently the reaction mixture is gradually heated under reflux to 95° C. until a practically clear solution is produced. Excess of oxalyl chloride and most of the chlorobenzene are distilled off in a slight vacuum. The distillation residue is dissolved in 1 l. of absolute ether. The solution is treated with a mixture of 60 g. of diethylamine, which has been distilled over sodium, and 200 cc. of absolute ether. The mixture is heated under reflux for ½ hour. The resulting precipitate is filtered with suction and is washed with ether. 119 g. are obtained. After a single reprecipitation by way of sodium hydroxide solution and hydrochloric acid, the yield amounts to 76 g. (M. P. 224–225° C. with decomposition). Further purification takes place by way of the sodium salt of the compound, which is salted out from its aqueous solution by means of sodium chloride. N,N-diethyl-N'-(3-carboxy-2,4,6-triiodo phenyl)-oxalic acid diamide of the formula

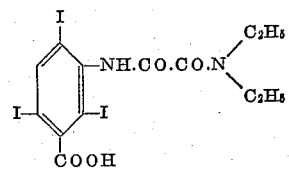

is set free from the sodium salt by means of dilute hydrochloric acid. It has a melting point of 240–241° C. (with decomposition).

Example 13

300 cc. of anhydrous chlorobenzene are heated to 130° C. with 110 g. of adipyl chloride. 155 g. of very well dried triiodo amino benzoic acid are gradually added to said mixture. After cooling, the mixture is extracted with N/2 sodium hydroxide solution. The aqueous alkaline layer is extracted with ether, completely freed from ether, and introduced into an excess of hydrochloric acid (1:3). The resulting precipitate consists essentially of adipic acid mono-(3-carboxy-2,4,6-triiodo anilide) and a small amount of adipic acid di-(3-carboxy-2,4,6-triiodo anilide). The two reaction products are separated by repeated fractional reprecipitation from sodium hydroxide solution by means of hydrochloric acid whereby the di-anilide precipitates first. The twice reprecipitated adipic acid mono-(3-carboxy-2,4,6-triiodo anilide) of the formula

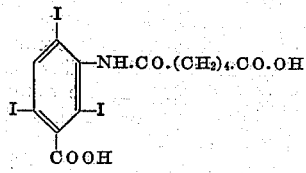

has a melting point of 245–247° C. which can be increased, if desired, by further application of the same purification method, to 252–257° C.

Example 14

100 g. of 2,4,6-triiodo amino benzoic acid are dissolved in 750 cc. of absolute ether, treated with a mixture of 30 g. of phenyl isocyanate and 750 cc. of absolute ether, and the mixture is heated under reflux for 7 hours. The precipitate formed is filtered with suction, washed with ether, and reprecipitated from its solution in sodium hydroxide solution by means of hydrochloric acid. M. P. 245° C. (with decomposition). Yield: 104 g. of N-phenyl-N'-(3-carboxy-2,4,6-triiodo phenyl)-carbamide of the formula

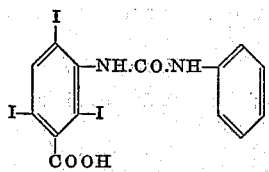

Example 15

15.75 g. of 2,4,6-triiodo-3-amino benzoic acid are dissolved in 60 cc. of hot chlorobenzene and slowly, while the mixture is maintained gently boiling, a solution of 3.41 g. of α,δ-dibromo adipic acid dichloride in 20 cc. of chlorobenzene is added drop by drop. After about 5 hours evolution of hydrochloric acid has ceased and the precipitated crude α,δ-dibromo adipic acid di-(3-carboxy-2,4,6-triiodo anilide) of the formula

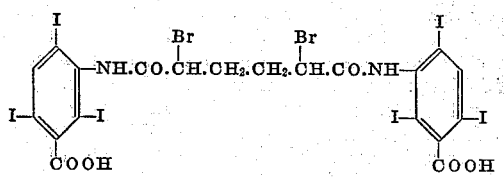

is filtered with suction. For purification, it is treated several times with ether and recrystallized from methanol. M. P. 251–253° C. (with decomposition). Yield: 9.5 g.

Example 16

213 g. of triiodo-amino benzoic acid are dissolved, while heating, in 850 cc. of dry chlorobenzene. 50 g. of anhydromethylene citric acid dichloride are added drop by drop to said solution, while boiling. The precipitate formed is filtered hot with suction and extracted by boiling a few times with ether. The crude product (105 g.) is dissolved in saturated methanolic urea solution. The turbid solution is slightly acidified and clarified with hydrochloric acid (1:5). From the clear solution there is obtained by the addition of a large quantity of water anhydromethylene citric acid di-(3-carboxy-2,4,6-triiodo anilide) of the formula

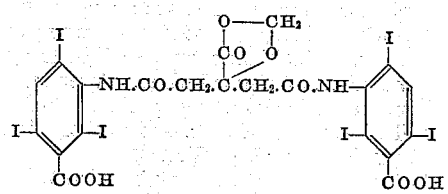

in the form of a colourless powder having a melting point of 250–252° C.

Example 17

5.6 g. of thiodiglycolic acid dichloride are introduced dropwise into a boiling solution of 50 g. of 2,4,6-triiodo-3-amino benzoic acid in 150 cc. of chlorobenzene. After about 3 hours evolution of hydrochloric acid has ceased. The precipitated crude thiodiglycolic acid di-(3-carboxy-2,4,6-triiodo anilide) of the formula

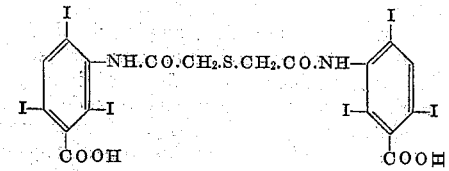

is filtered with suction and washed with ether. For purification, the compound is dissolved in N caustic soda solution, filtered over charcoal, and precipitated with hydrochloric acid; M. P. 263–265° C. (with decomposition), yield: 26.3 g.

Example 18

54 g. of 2,4,6-triiodo amino benzoic acid are dissolved, while heating, in 250 cc. of dry chlorobenzene. 8.5 g. of diglycolic acid dichloride are added drop by drop to said solution and the mixture is further heated for ½ hour under reflux. The resulting precipitate is filtered with suction and washed first with a little chlorobenzene and then with a large quantity of petrol ether. The crude product is purified by reprecipitation of its sodium hydroxide solution by means of hydrochloric acid. The pure diglycolic acid di-(3-carboxy-2,4,6-triiodo anilide) of the formula

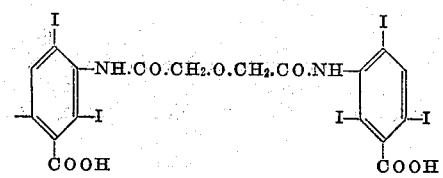

has a melting point of 290–292° C. (with decomposition). Yield: 22.5 g.

Example 19

20 g. of 3-chloro acetyl amino-2,4,6-triiodo benzoic acid are treated with a solution of 14.5 g. of piperazine in 140 cc. of alcohol and the mixture is allowed to stand at room temperature for 24 hours and is then heated for 2 hours on a steam bath. The resulting precipitate of piperazine-N,N'-di-(acetic acid - 3 - carboxy-2,4,6-triiodo anilide) of the formula

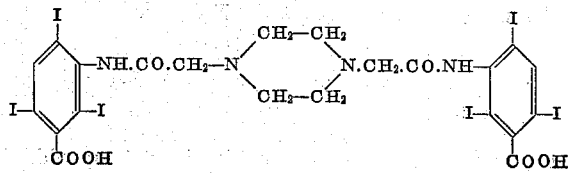

is filtered with suction and treated first with dilute hydrochloric acid and then with methanol. The product is a colourless powder having a melting point of 218–220° C.

Example 20

40 g. of pure adipic acid di-(3-carboxy-2,4,6-triiodo anilide), obtained, for instance, according to example 5, are added, while stirring, at room temperature to a mixture of 17.1 cc. of 4.1 N pure, aqueous lithium hydroxide solution and 45 cc. of distilled water. After the addition is complete, the total volume is immediately made up with twice distilled water to 80.0 cc. and further stirred until complete solution has taken place.

To clarify said solution, it may be stirred, if desired, with a small quantity of kieselguhr (ignited and washed with acid) and is then finally filtered.

The colorless, clear, and neutral solution of the lithium salt thus obtained contains 500 mg. of adipic acid di-(3-carboxy-2,4,6-triiodo anilide) or 334 mg. of organically combined iodine per cc. The solution may be filled into ampoules and heat sterilized in the customary manner, during which operation it is not decomposed. Thereby a non-irritating injection solution adapted for X-ray diagnosis is obtained.

Example 21

80 g. of pure, finely powdered adipic acid di-(3-carboxy-2,4,6-triiodo anilide) are stirred at room temperature into 150 cc. of twice distilled water. 5.2 g. of finely powdered purest lithium carbonate are gradually added to the suspension, while stirring continuously. Thereafter the total volume of the resulting mixture is immediately made up with twice distilled water to 200.0 cc.

After a few hours of stirring, the acid has practically completely passed into solution and evolution of carbon dioxide has ceased. The solution is further worked up as described in Example 20.

1 cc. of such a solution contains 400 mg. of adipic acid di-(3-carboxy-2,4,6-triiodo anilide) or 267 mg. of organically combined iodine.

Example 22

To a lithium salt solution, prepared as described in Examples 20 or 21, which contains about 40 percent by volume of adipic acid di-(3-carboxy-2,4,6-triiodo anilide), there is added 5 times its volume of isopropyl alcohol. The mixture is heated on a steam bath, while shaking, until suddenly the microcrystalline lithium salt precipitates. It is immediately filtered with suction.

The salt is washed on the filter with isopropyl alcohol and then dried in a vacuum at 100° C. The neutral lithium salt of adipic acid di-(3-carboxy-2,4,6-triiodo anilide) has a melting point of 308–312° C. (with decomposition). It dissolves to about 50 percent by volume in water at room temperature. The solution has a pH of about 7.0.

Example 23

35 g. of adipic acid di-(3-carboxy-2,4,6-triiodo anilide) are gradually introduced, while stirring, into a solution of 3.9 g. of pure ethanolamine in 130 cc. of distilled water. The solution which is not quite clear is made up with distilled water to 160 cc., stirred for a further 2 hours, and finally filtered for clarification. After 3 days 26 g. of the salt precipitate from the filtrate. The ethanol ammonium salt of adipic acid di-(3-carboxy-2,4,6-triiodo anilide) is filtered with suction and washed with isopropanol. It melts at 271–272° C. with decomposition.

With water it gives neutral, non-irritating and heat-sterilizable solutions adapted for X-ray diagnosis.

Example 24

28.5 g. of adipic acid di-(3-carboxy-2,4,6-triiodo anilide) are introduced gradually, while stirring, into a solution of 5.25 g. of pure diethanolamine in 120 cc. of distilled water. The resulting solution is made up with distilled water to 143 cc., filtered, if desired, and then allowed to stand for 3 days at room temperature. The precipitate is filtered with suction, washed with isopropanol, and dried in a vacuum at 40° C. In this manner 18 g. of the diethanol ammonium salt of adipic acid di-(3-carboxy-2,4,6-triiodo anilide) decomposing at 178° C. are obtained. Its aqueous solution is neutral and non-irritating and can be heat sterilized.

Example 25

28.5 g. of adipic acid di-(3-carboxy-2,4,6-triiodo anilide) are introduced gradually, while stirring, into a solution of 7.6 g. of 98% triethanolamine in 30 cc. of water. The mixture is made up with distilled water to 57 cc. The resulting solution, if desired, after filtration, is evaporated to dryness in a vacuum desiccator over solid potassium hydroxide, the residue is suspended in isopropanol, filtered with suction, and washed with isopropanol. In this manner 31.5 g. of the triethanol ammonium salt of adipic acid di-(3-carboxy-2,4,6-triiodo anilide) having a decomposition point of 200–205° C. are obtained. Said salt is more soluble in water than the salts obtained according to Examples 23 and 24. It also gives neutral, non-irritating and heat sterilizable solutions adapted for use as X-ray contrast agents.

Example 26

The equivalent amount of glucosamine hydrochloride is added to a 40% by volume solution of the lithium salt of adipic acid di-(3-carboxy-2,4,6-triiodo anilide). First a clear solution is obtained from which a white precipitate gradually separates. Said precipitate, after filtration with suction, is suspended in a little alcohol, again filtered with suction and washed free from chlorine ions with as little alcohol as possible. The glucosammonium salt of adipic acid di-(3-carboxy-2,4,6-triiodo anilide) thus obtained is dried at room temperature over phosphorus pentoxide. It has an unsharp decomposition point of about 250° C. The aqueous solution of this salt is also completely non-irritating and suitable for injection as an X-ray contrast agent.

Example 27

4.2 g. of lysidine are dissolved in 190 cc. of distilled water. To this solution there are gradually added, while stirring, 28.5 g. of adipic acid di-(3-carboxy-2,4,6-triiodo aniline). The resulting solution is made up with distilled water to 142 cc. and is filtered, if desired. After evaporating the water in a vacuum desiccator and drying the residue over phosphorus pentoxide at 60° C., 32 g. of the lysidinium salt of adipic acid di-(3-carboxy-2,4,6-triiodo anilide) are obtained. Its aqueous solution is neutral, non-irritating and can be heat sterilized.

Example 28

57 g. of finely pulverized adipic acid di-(3-carboxy-2,4,6-triiodo anilide) are ground in an oscillation mill for 8 hours with 50 cc. of distilled water to form a homogeneous paste. To this mass there are added 50 cc. of 2 N aqueous piperazine solution. The mixture is made up with distilled water to 143 cc. and is ground for a further 8 hours in the oscillation mill. In this manner an extremely fine, stable, colloidal suspension of the piperazinium salt of adipic acid di-(3-carboxy-2,4,6-triiodo anilide) is obtained, which contains 400 mg. of organically combined iodine per cc. This colloidal suspension is of neutral reaction, non-irritating, non-hypertonic, and can be heat sterilized in the usual way and diluted, without flocculation, to any extent with distilled water or physiological salt solution. If desired, solutions of protective colloids or wetting agents, such as carboxy methyl cellulose known to the trade by the trade name Tylose, Tween 80, and others, may be added. Such a solution is adapted for the X-ray exploration of body cavities, especially for vasography.

Example 29

To a solution of 4.92 g. of purest citric acid (HOOC.CH$_2$.C(OH)(COOH).CH$_2$.COOH.(H$_2$O))

and 3.02 g. of purest anhydrous piperazine in distilled water, which has been made up to 80 cc., there are added all at once in a high efficiency emulsifier, for example in a "Multimix" apparatus, 120 cc. of an aqueous solution of 41.5 g. of the neutral sodium salt of adipic acid di-(3-carboxy-2,4,6-triiodo anilide). The resulting extremely fine colloidal suspension of the piperazinium salt of adipic acid di-(3-carboxy-2,4,6-triiodo anilide) is neutral and practically isotonic. It contains 20% by volume of said contrast agent (calculated for free acid) and is suitable for the same applications as the solution of Example 28.

Example 30

0.5 g. of carboxy methyl cellulose known to the trade by the trade name Tylose is dissolved, while stirring, in 48 cc. of distilled water. To this solution there are added, while stirring, 20.8 g. of the neutral sodium salt of adipic acid di-(3-carboxy-2,4,6-triiodo anilide). The volume of said mixture is made up with distilled water to 60 cc. To the resulting solution, which is not clear, there are added all at once, while briskly stirring in a "Multimix" emulsifier, 40 cc. of an aqueous solution of 1.51 g. of purest anhydrous piperazine, 2.46 g. of purest citric acid (HOOC.CH$_2$C(OH)(COOH).CH$_2$.COOH.(H$_2$O)), and 0.5 g. of carboxy methyl cellulose known to the trade by the trade name of Tylose. The resulting colloidal suspension is extremely fine and stable and can be used for the same purposes as the preparations obtained according to Examples 28 and 29. Such a suspension, on account of its high viscosity, is especially suitable for bronchography and salpingography.

Example 31

57 g. of finely powdered adipic acid di-(3-carboxy-2,4,6-triiodo anilide) are ground for 8 hours in an oscillation mill with 50 cc. of distilled water, 50 cc. of 2 N aqueous piperazine solution are added thereto, and the mixture is ground for a further 8 hours. The resulting suspension is evaporated to dryness in a vacuum desiccator over phosphorus pentoxide, and the residue is completely dried in a vacuum over phosphorus pentoxide at 60° C. In this manner 61 g. of the piperazinium salt of adipic acid di-(3-carboxy-2,4,6-triiodo anilide), having a decomposition point of 281–282° C., are obtained. This salt has a strong tendency, on suspending the same in water, to pass reversibly into stable, colloidal suspension.

In the place of the polycarboxylic acid derivatives employed in the preceding examples as reaction components for condensation with 2,4,6-triiodo-3-amino benzoic acid or its functional derivatives, such as its esters or amides, there may be used, while proceeding under similar conditions as described in said examples, a great number of other polycarboxylic acid derivatives of which the following is a selection of the more readily available and suitable compounds:

In the place of phosgene of Example 9, for instance, there may be used chloro carbonic acid methyl, ethyl, propyl, butyl, isobutyl, isoamyl, allyl and the like esters, or chloro carbonic acid alkyl carboxylic acid esters, such as chloro carbonic acid methyl carboxylic acid ethyl ester Cl.CO.OCH$_2$.CO$_2$C$_2$H$_5$, carbamic acid chloride, and the N-alkyl and N,N-dialkyl substituted carbamic acid chlorides, such as methyl and ethyl carbamic acid chlorides and dimethyl and diethyl carbamic acid chlorides.

In the place of oxalylchloride of Example 4 and of ethyl oxalyl chloride of Example 3 there may be used other oxalic acid ester chlorides, such as the methyl, n-propyl, isobutyl, amyl oxalyl chloride.

In the place of malonylchloride of Example 1, there may be used various ester chlorides, such as methyl, ethyl, n-propyl, isopropyl, n-butyl, isobutyl malonic acid ester chloride, or alkyl, cycloalkyl, aryl, aralkyl substituted malonyl chlorides such as methyl, ethyl, n-propyl, isopropyl, n-butyl, isobutyl, diethyl, propyl methyl, methyl ethyl, isopropyl methyl, cetyl, dibenzyl, ethyl phenyl, ethyl benzyl, diallyl, cyclo hexenyl, ethyl cyclohexenyl, and other alkyl substituted malonyl chlorides or their acid ester chlorides.

In the place of succinyl chloride of Example 2 there may be used succinyl anhydride, various alkyl substituted succinyl chlorides, such as methyl, ethyl, n-propyl, isopropyl, isobutyl succinyl chlorides, the symmetric and the asymmetric dialkyl succinyl chlorides and the correspond succinic acid ester chlorides, such as succinic acid ethyl ester chloride and others.

Substituted succinyl chlorides and ester chlorides may, of course, also be employed, such as the chlorides and ester chlorides of tartaric acid, aspartic acid, chloro succinic acid and others.

Other polycarboxylic acid derivatives than those mentioned in the other examples may be employed as reaction components of which the acid halogenides and acid ester halogenides of the following acids may be mentioned:

Fumaric acid,
Maleic acid,
Glutaric acid,
mono-, di-, and trialkyl glutaric acids,
Pimelic acid,
Sebacic acid,
β-Methyl adipic acid,
1,10-decane dicarboxylic acid,
1,12-dodecane dicarboxylic acid,
1,14-tetradecane dicarboxylic acid,
Itaconic acid,
Citraconic acid,
Mesaconic acid,
Glutaconic acid,
Muconic acid,
Hydromuconic acid,
Malic acid,
Tartronic acid,
Hydroxy glutaric acid,
Glutamic acid,
Hydroxy citraconic acid,
Mesoxalic acid,
Oxaloacetic acid,
Aconitic acid,
α-Keto glutaric acid,
Oxalocitraconic acid, and other substituted and unsubstituted polycarboxylic acids.

As reaction components in which the carbon chain is interrupted by a hetero atom or by a hetero atom group, there may be used in the place of thio diglycolic acid dichloride of Example 17 and of diglycolic acid dichloride of Example 18, other halogenides of similar constitution and the corresponding acid ester halogenides, such as, for instance, the halogenides of imino succinic acid HOOC.CH$_2$.NH.CH$_2$.COOH, imino dipropionic acid

HOOC.CH(CH$_3$).NH.CH(CH$_3$).COOH thio dilactic acid $$S\begin{cases} C(CH_3)(OH).COOH \\ C(CH_3)(OH).COOH \end{cases}$$

γ-thio dibutyric acid, cystine, β-dithio dipropionic acid, and others.

In the place of ethyl oxalyl chloride used in Example 3, there may be employed other acid ester halogenides, such as methyl oxalyl chloride, β-carbomethoxy propionyl chloride, γ-carboethoxy butyryl chloride, γ-carboethoxy valeryl chloride, ω-carboethoxy octanoyl chloride and many others.

It is, of course, also possible to first prepare the methyl ester of 2,4,6-triiodo-3-amino benzoic acid by reacting the acid with thionyl chloride and converting the resulting acid chloride into the methyl ester whereby the procedure is about the same as described in Example 11, and then reacting said ester with adipic acid dichloride according to Example 5 whereby the same reaction product is obtained as in Example 11. Of course, when using other alcohols than methanol, other esters, such as the ethyl, n-propyl, isopropyl, n-butyl, isobutyl, amyl, benzyl, furfuryl, are obtained. When reacting the solution of the acid chloride obtained by means of thionyl chloride, with ammonia or mono- or disubstituted bases, such as dimethyl, diethyl, ethyl, n-butyl, ethanol amine, diethanol amine, and other amines, piperidine, piperazine, morpholine, and other bases, the corresponding acid amides are obtained. It is understood that the conversion of the carboxylic acid into its amide may also be effected before or after its condensation with the reactive polycarboxylic acid derivative.

In the place of the lithium salts of the new compounds, there may be produced in the same manner as described in Examples 20 to 22 other salts of said compounds, such as the potassium, ammonium, sodium, calcium, magnesium, and other salts. Likewise salts with other organic bases than those mentioned in Examples 23 to 31 may be obtained by proceeding accordingly with other bases, such as, methylamine, ethylamine, piperidine, morpholine, N-methylglucamine, lysidine, 2,5-dimethylpiperazine, aminopropanediole,N-methylpropanediole and others.

In Examples 20 to 31 a number of salts of N-acyl derivatives of 2,4,6-triiodo-3-amino benzoic acid and their solutions and suspensions are described. Soluble salts of these new X-ray contrast agents are preferably used in aqueous solution whereby the concentration is preferably between about 40% by volume and about 60% by volume. These solutions are especially adapted for use in cholecystography, renography, cystography, urography, and the like. Other salts of these new compounds possess only a limited solubility in water. They have proved to be especially suitable in the form of aqueous emulsions and suspensions for vasography, bronchography, salpingography, and the like. Emulsions and suspensions for these purposes contain also considerable amounts of said salts. Usually the amounts must be at least about 15% by volume and may even exceed about 60% by volume.

Of course many other changes and variations in the reaction components used, the reaction conditions, reaction time and temperature employed, the solvents used, the methods of working up and of purifying the reaction products and their salts and functional derivatives, and the like may be made by those skilled in the art in accordance with the principles set forth herein and in the claims annexed hereto.

The term "acyl residue" as used herein and in the claims annexed hereto indicates not only any organic acyl residue but also the residue of carbonic acid.

Besides their usefulness as X-ray contrast agents some of the new compounds possess other valuable properties, e. g. cholagogic effects.

*Example 32*

52 g. of 2,4,6-triiodo-3-amino benzoic acid amide are introduced, while stirring, into 600 ccm. of anhydrous o-dichlorobenzene. About 100 ccm. of chlorobenzene are distilled off from the suspension heated to 140° under a slight vacuum. The distillation residue is heated to 165° to complete its dissolution. To the resulting solution there are added drop by drop within 30 minutes 21.5 g. of adipic acid ethyl ester chloride. After the addition is complete, the temperature is maintained for 2½ hours at 160–165° C. The resulting precipitate is filtered hot with suction, washed with petroleum ether and dried at 60° C. Yield: 35 g. of nearly pure ethyl ester of the adipic acid-(3-carbamido-2,4,6-triiodoanilide). (M. P. 266–268° C. with decomposition.) After recrystallization from methanol or glacial acetic acid M. P. 269–270° C. (with decomposition).

30 g. of the above ethyl ester of adipic acid-(3-carbamido-2,4,6-triiodoanilide) and 100 ccm. of N sodium hydroxide solution are heated to 60° C., while stirring, for three hours. The mixture is filtered by suction for removal of undissolved material. The filtrate is acidified with diluted hydrochloric acid. The precipitate produced thereby is recrystallized from methanol. The resulting adipic acid-(3-carbamido-2,4,6-triiodoanilide) has a melting point of 270–272° C. (with decomposition).

*Example 33*

14.3 g. of 3-amino-2,4,6-triiodo hippuric acid are dissolved, while stirring, in 125 ccm. of hot dioxane, 150 ccm. of chlorobenzene are added and 25 ccm. of the solvent are distilled off from the mixture under normal pressure. 2.3 adipic acid dichloride are added at 110–120° C., while stirring, within 30 minutes and the mixture is further heated to 110–120° C. for four hours. The produced precipitate is filtered hot with suction, twice extracted by boiling with methanol. The residue is purified by dissolving it in 0.5 N sodium hydroxide solution and precipitating by N hydrochloric acid. Yield: 10 g. of adipic acid di-[3-(carbamido-N-acetic acid)-2,4,6-triiodoanilide], M. P. 240° (with decomposition).

We claim:

1. X-ray contrast agents selected from the group consisting of an N-acyl derivative of 2,4,6-triiodo-3-amino benzoic acid of the following formula

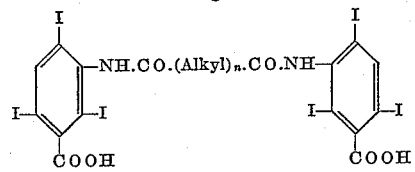

wherein $n$ indicates the numbers 0 to 14, and the salts of such acids with alkali metals, ammonia, alkaline earth metals, and substantially non-toxic organic bases.

2. A new X-ray contrast agent comprising adipic acid di-(3-carboxy-2,4,6-triiodo anilide).

3. A colorless, clear, substantially neutral, non-irritating, injectable, sterile aqueous solution of the lithium salt of adipic acid di-(3-carboxy-2,4,6-triiodo anilide), said solution containing between about 40% by volume and 60% by volume of said salt in solution, said solution being adapted for use as X-ray contrast agent.

4. A stable colloidal aqueous suspension of the piperazine salt of adipic acid di-(3-carboxy-2,4,6-triiodo anilide), said suspension being isotonic and of substantially neutral reaction and containing between about 15% and about 40% of said salt, said suspension being adapted for use as X-ray contrast agent, especially for vasography.

5. A new X-ray contrast agent comprising the neutral sodium salt of adipic acid di-(3-carboxy-2,4,6-triiodo anilide).

6. A new X-ray contrast agent comprising the N-methyl glucamine salt of adipic acid di-(3-carboxy-2,4,6-triiodo anilide).

References Cited in the file of this patent

UNITED STATES PATENTS 2,611,786  Wallingford _____ Sept. 23, 1952

OTHER REFERENCES

Amer. Jour. Pharm., Nov. 1950, page 409.
Jour. American Pharm. Assn. (Sci. Ed.), Dec. 1953, pages 721–728.